Feb. 17, 1931.      A. O. WISTI      1,792,790
RIVETING AND PUNCHING MACHINE
Filed Oct. 10, 1929      5 Sheets-Sheet 5

Inventor
ANDREW O. WISTI
Attorneys

Patented Feb. 17, 1931

1,792,790

UNITED STATES PATENT OFFICE

ANDREW O. WISTI, OF MINNEAPOLIS, MINNESOTA

RIVETING AND PUNCHING MACHINE

Application filed October 10, 1929. Serial No. 398,622.

This invention relates to a riveting and punching machine and particularly to such a machine of the automatic type. While the machine is capable of use with various types of work, it more especially is designed for applying rivets to and removing rivets from brake linings and brake bands such as now commonly used on automobiles. It is now the common practice to reline the brake bands, and the lining, which is of some fabric material, is riveted to the band, which is of metal. It is desirable in such a machine to have the same constructed and arranged so that it can be very quickly operated and so that it will at the same time do accurate work. In machines of the prior art, the machine was set in operation by a lever or treadle. This operation is rather slow and it is desirable to have a machine which will be set in operation by the work when the same is placed in position so that a subsequent operation of a lever or treadle is unnecessary.

It is an object of this invention, therefore, to provide a riveting machine as well as a punching machine in which the operating parts are set in motion by pressure of the work against parts of the machine.

It is another object of the invention to provide a machine comprising a rivet setting or clinching member, which machine is automatically operated when pressure is exerted upwardly against said rivet setting or clinching member.

It is another object of the invention to provide a machine having means for inserting the rivet through the brake band and lining and then clinching the rivet in position.

It is still another object of the invention to provide a machine having means for removing rivets from a brake band and lining as when the lining is to be removed from the band or when an imperfect setting operation has been performed in attaching the lining to the band.

It is still a further object of the invention to provide a machine comprising a punching member and means acting in cooperation therewith which is set in operation by the pressure of the work against said punching member which punching member may constitute a rivet removing element.

It is still another object of the invention to provide a machine having means for disposing of the rivets and collecting the same when they are removed from the brake band and lining.

It is also an object of the invention to provide a machine having a rivet setting member and a punching member together with means cooperating with said rivet setting member, means cooperating with said punching member and an actuating mechanism with means for connecting said mechanism to said first or second means respectively when pressure is exerted against said rivet setting member or punching member respectively.

It is also an object of the invention to provide a machine comprising a riveting element, a punching element, means co-acting with said riveting element to operate on the work, means co-acting with said punching element to operate on the work, together with means for actuating either of said first mentioned means accordingly as pressure is exerted on either of said elements.

These and other objects and advantages of the invention will be fully set forth in the following description made in connection with the accompanying drawings, in which like reference characters refer to similar parts throughout the several views, and in which:—

Figure 1:
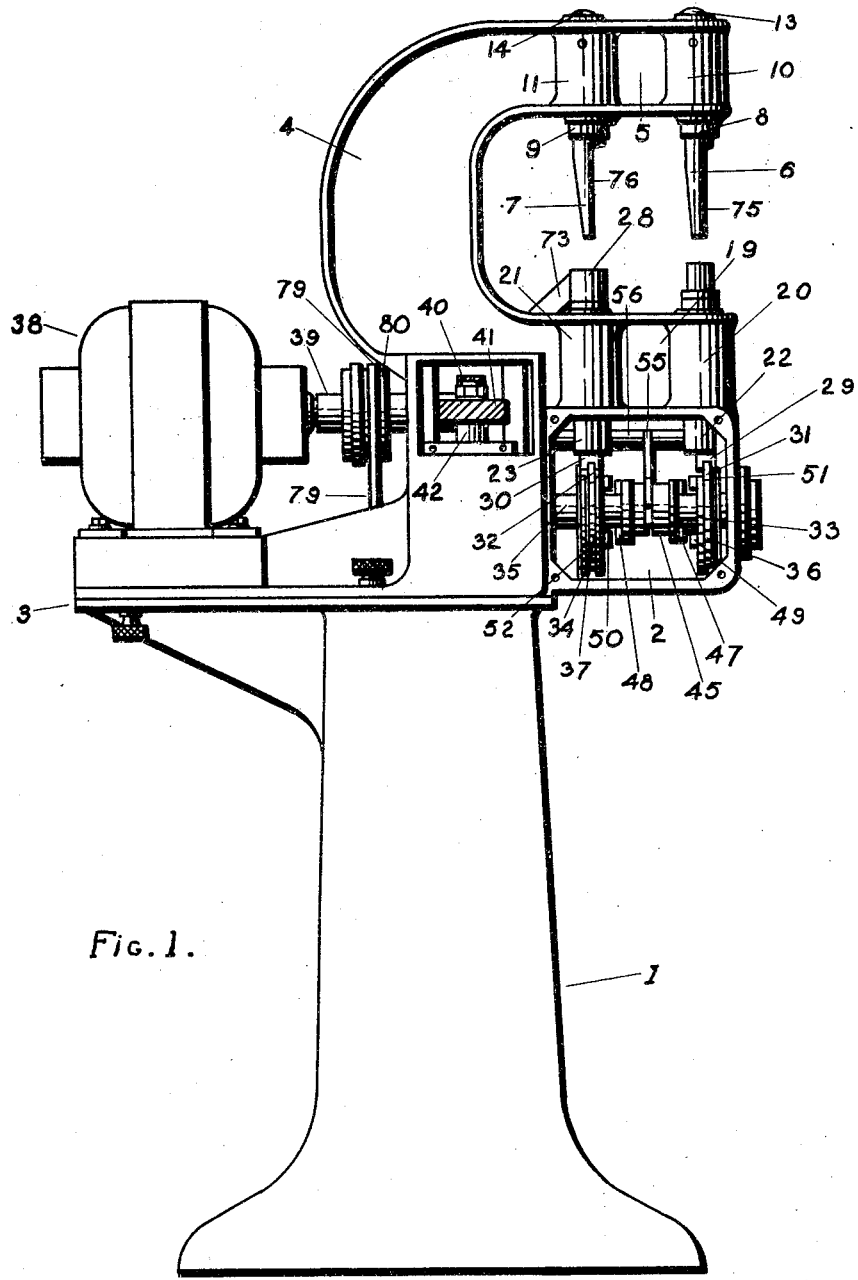
Fig. 1 is a side elevation of the machine with parts thereof removed.
Figure 2:
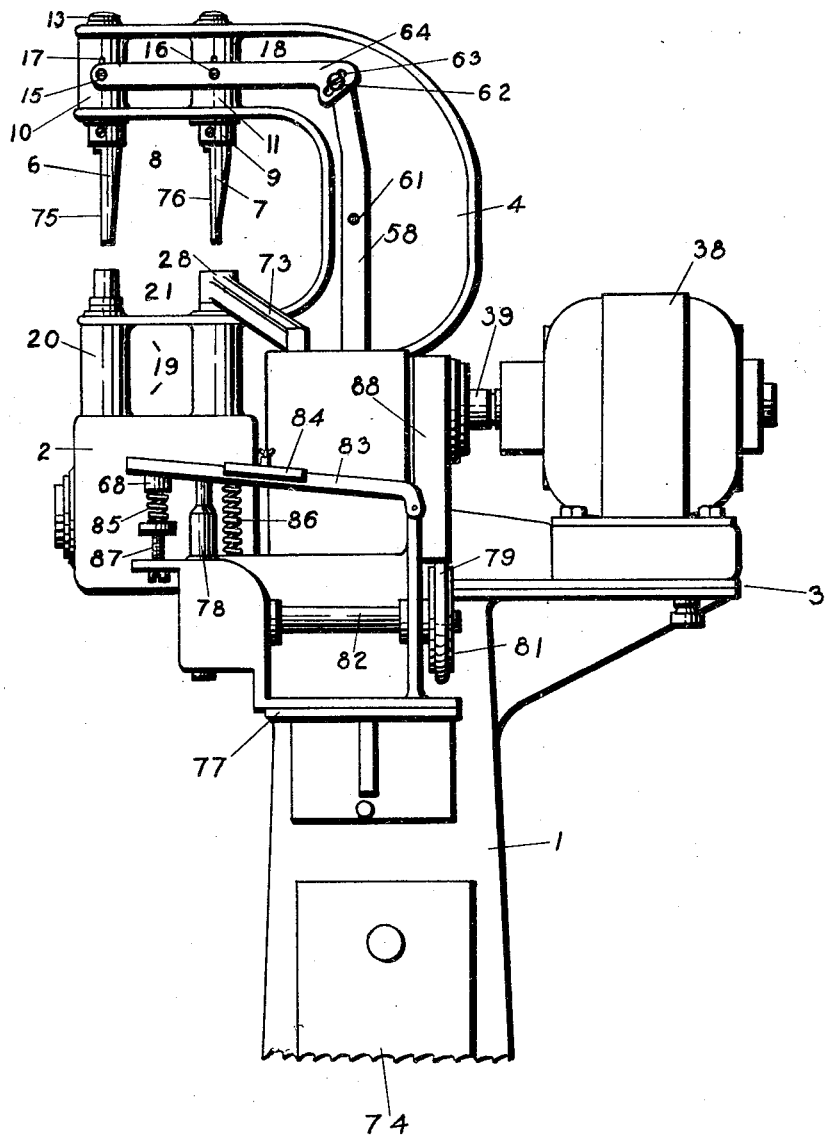
Fig. 2 is a similar view of the opposite face thereof.

Referring to the drawings in which similar reference numerals designate corresponding parts throughout the several views, the numeral 1 designates the base of the machine, which is preferably hollow and having a hollow head 2 at its upper end and also a platform 3.

Extending upwardly from the hollow head 2 is a substantialy C shaped yoke 4, in the upper arm 5 of which is mounted a riveting member or bar 6 and a punch bar 7, said bars being attached to plungers 8 and 9, respectively, which are in turn slidably mounted in sockets 10 and 11, on the arm 5, a retarding spring 12 being positioned between the upper ends of the plungers and plugs 13 and 14 in the upper ends of the sockets, said springs serving to return said plungers to their normal lowered positions when upward pressure is released therefrom.

The plungers 8 and 9 have bolts 15 and 16, respectively attached thereto which extend through elongated slots 17 and 18 in the walls of the sockets 10 and 11, said bolts limiting the downward movement of said plungers while the upward movement thereof is limited by said plugs 13 and 14.

The lower arm 19 of the yoke 4 is likewise provided with a pair of sockets 20 and 21, which are in vertical alignment with the sockets 10 and 11, extending through which, are plungers 22 and 23, the upper end of the plunger 22 having a socket 24 therein in which is mounted a rivet holding member 25, while the plunger 23 has a socket 26 therein for the reception of the shank 27 of a hollow anvil 28.

Threaded into engagement with the lower ends of the plungers 22 and 23 are shanks 29 and 30, the lower ends of said shanks being bifurcated to receive bearing wheels 31 and 32, respectively, said wheels bearing against cams 33 and 34, respectively, rotatably mounted on a shaft 35, the peripheral edges of the cams 33 and 34 having channels 36 and 37, respectively, in which the wheels 31 and 32 travel and by means of which the cams are held in alinement with the plungers 22 and 23. The shaft 35 is mounted in the hollow head 2 and is driven through the medium of a motor 38, mounted upon the platform 3 and coupled with a horizontally mounted shaft 39, one end of said shaft entering said housing 2 and having a spiral gear 40 connected therewith. The spiral 40 cooperates with a worm gear 41 mounted on the upper end of a vertically extending shaft 42, the opposite end of said shaft 42 having a worm 43 thereon, which meshes with a worm gear 44 on the shaft 35.

Mounted upon the shaft 35 at a point between the cams 33 and 34 is a clutch 45, said clutch having longitudinal movement on the shaft, but being caused to rotate therewith by means of a key 46. At the opposite ends of the clutch 45 are teeth 47 and 48, respectively, which are adapted to cooperate with similar teeth 49 and 50 on the meeting faces of the cams 33 and 34, so that when the clutch mechanism is shifted to the right or left, one or the other of said cams will be engaged and caused to rotate with the shaft 35, thereby operating one or the other of the plungers 22 or 23. The plungers 22 and 23 are adjusted vertically for regulating the distance between the ends of the rivet holding member 25 and the riveting bar 6 and the anvil 28 and the punch bar 7, by adjusting the shanks 29 and 30 with respect to the plungers 22 and 23. Said shanks are similar and are threaded into plungers 22 and 23 so that their position therein can be varied. The bearing wheels are held constantly against the peripheral faces of the cams 33 and 34, by means of circular bands or yokes 51 and 52, which are preferably pivoted to the bearing pins 53 and 54, employed for holding the bearing wheels 31 and 32 to the shanks 29 and 30.

By pivotally mounting the bands 51 and 52 in the manner shown and so arranging them that a portion thereof will always surround a portion of the peripheral edges of the cams 33 and 34, the bands will swing laterally in either direction as the cams are rotated and thus retain the bearing wheels in constant contact with the cams and cause the plungers 22 and 23 and parts carried thereby to descend as the cams return to their initial positions.

The clutch 45 is shifted longitudinally of the shaft 35, by means of a fork 55, the upper end of which is attached to a rod 56, the ends of which are mounted in bearings 57 on the walls of the housing 2, said bearings being so arranged that said rod may have limited endwise movement. The rod 56 is moved longitudinally in either direction by means of a lever 58, the lower end thereof having a notch 59 which straddles a pin 60 attached to the rod 56. The lever 58 is fulcrumed to the yoke 4 by means of a pin 61, so that when the upper end of the lever is swung back and forth, the clutch 45 will be moved into engagement with one or the other of the cams 33 or 34. The upper end of the lever 58 has a stud 62 attached thereto, which projects through a slot 63 in one end of an operating bar 64, said bar being pivoted on the bolts 15 and 16 and so arranged that when upward pressure is directed against one of the plungers in the arm 5, the lever 58 will be rocked in one direction and swung in the opposite direction when upward pressure is directed against the other plunger of said arm. To accomplish this latter operation the slot 63 is directed at an angle to the vertical trend of the lever 58 and with the stud 62 resting at substantially the longitudinal center of the slot when the lever is at rest.

When upward pressure is applied against one of the bars 6 or 7, the spring 12 of the unpressed bar will retard the upward movement of that particular bar and cause the operating bar to fulcrum on either the bolt 15 or 16, depending upon which of the bars 6 or 7 the upward pressure is applied.

The rivet holding member 25 comprises a mandrel 65 having a fixed head 66 at its upper end and a removable base 67 at its lower end, a rivet retaining cup 68 being slidably mounted on the mandrel 65, the walls of the cup being of such height as to retain and properly guide a rivet 69 when placed therein, through the brake lining 70 and brake band 71. The cup 68 is slidably mounted on the mandrel 65 so that when the top edge thereof contacts with the brake lining 70 it will slide downwardly on the mandrel and permit the head 66 to force the rivet 69 firmly against the end of the riveting bar 6 and positively clinch the rivet in engagement with the brake band and lining. The cup is normally held upwardly around the head 66 by means of a spring 72 positioned between the cup 68 and the removable base 67 and coiled around the stem of the mandrel 65.

The hollow anvil 28 has a chute 73 communicating therewith which carries the extracted rivets downwardly into the interior of the base of the machine where they are discharged into a drawer-like receptacle 74, which may be removed to empty the rivets therefrom. The chute 73 is preferably made in two sections, one of which telescopes into the other, and by constructing the chute in this manner the anvil 28 may be readily raised and lowered with the plunger 23 or be readily removed from said plunger when desired without removing the entire chute.

Figure 3:
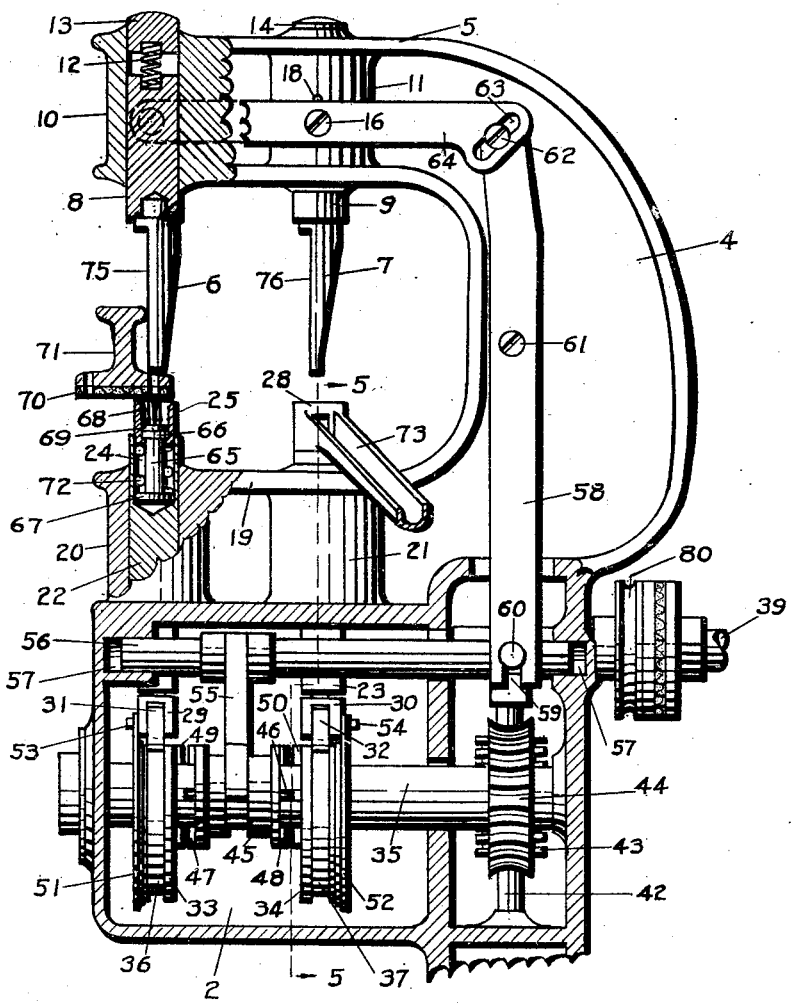
Fig. 3 is a detail sectional view through parts of the machine.
Figure 4:
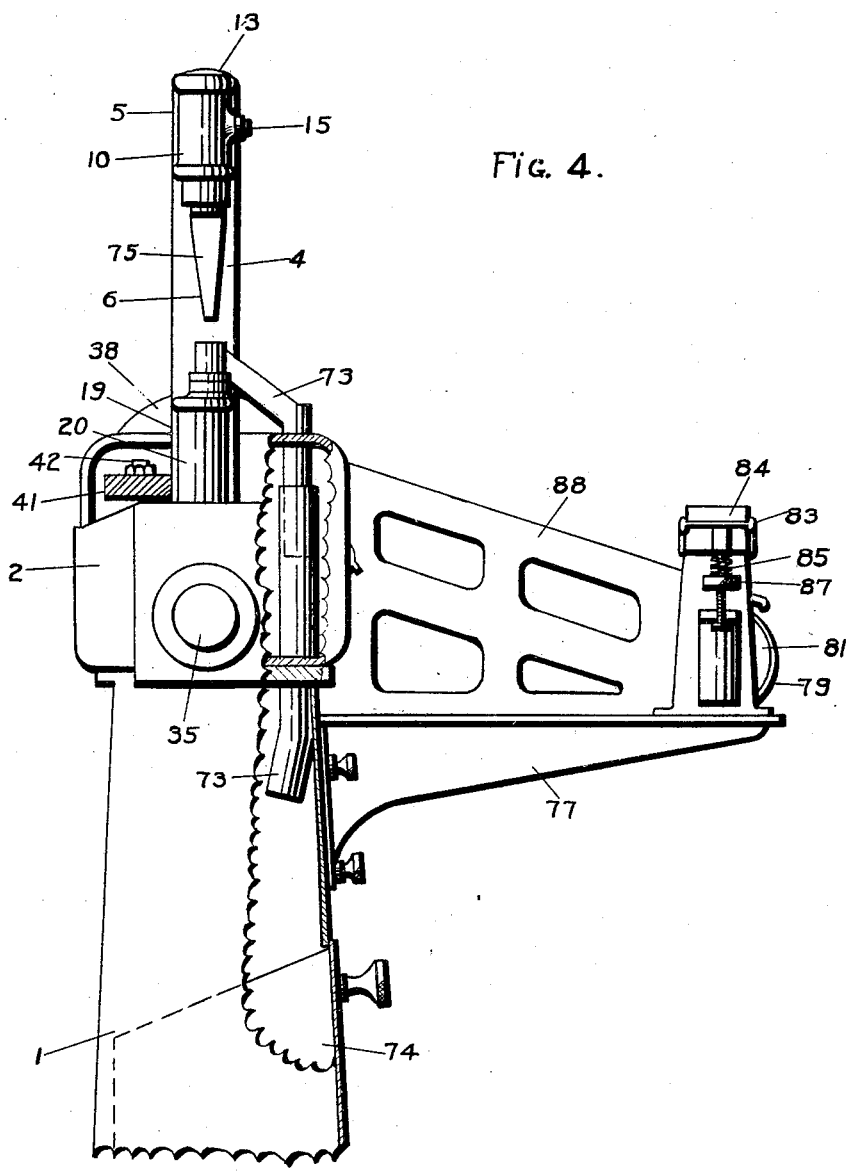
Fig. 4 is an end elevation of the machine with parts broken out.
Figure 5:
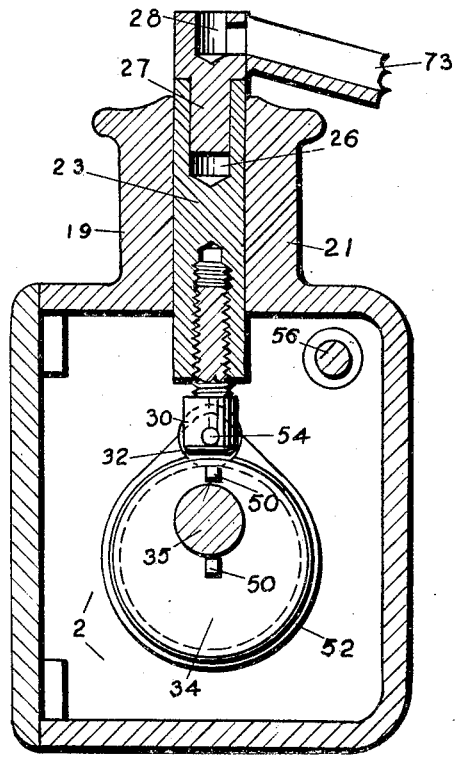
Fig. 5 is a section view as seen along line 5—5 of Fig. 3.
Figure 6:
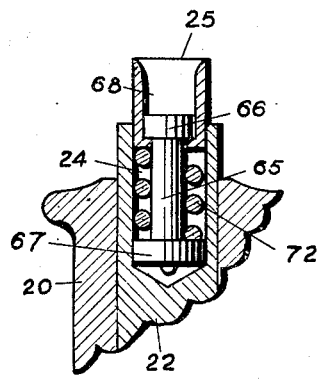
Fig. 6 is an enlarged detail sectional view through the rivet holding element.

The bars 6 and 7 are cut away on one side to provide flat faces 75 and 76, respectively, so that a brake band having an I-beam formation may be readily positioned so that the bars will engage the rivets extending therethrough, as shown in Fig. 3.

Extending laterally from one face of the base 1 is a bracket 77 upon which is mounted a combined reamer and countersink 78 which is operated or driven from the motor 38 through the medium of a belt 79 extending around a sheave 80 on the shaft 39 and around a sheave 81 on a shaft 82, said shaft and reamer element having intermeshing gears (not shown), by means of which the reamer is driven. Pivotally mounted at one end to parts of the bracket 77 is a bar 83, on which is adjustably mounted a guide 84, so that by properly setting the guide on the bar, the openings may be reamed at any suitable distance from the edge of the brake band and by having the guide, the reaming and countersinking operation may be quickly and accurately accomplished. The bar 83 is normally held level with or slightly above the upper end of the reamer 78 by means of springs 85 and 86, the spring 85 being adjusted lengthwise by means of an adjusting screw 87, threading through parts of the bracket 77. The belt 79 is protected by means of a shield 88 which also serves to reinforce the bracket 77.

In operation, when a new lining is being applied to the brake band, the lining 70 is placed over the face of the brake band 71 and these elements then placed over the reamer 78, with one of the openings through the brake band in alinement with the reamer, and the lining resting on the bar 83. Downward pressure is then applied to the brake band, such downward pressure being continued until the reamer has passed through the lining and formed a hole therethrough. The brake band and lining are then positioned between the riveting bar 6 and the rivet retaining cup 68, a rivet 69 having first been entered in the cup 68, when by forcing the brake band upwardly against the riveting bar 6, the end of the operating bar 64 connected with the plunger 22, will be elevated and the slotted end thereof lowered, which will rock the lever 58 and move the teeth 47 into engagement with the teeth 49 of the cam 33 and cause said cam to rotate with the clutch.

The rotation of the cam 33 forces the plunger 22 upwardly, thus directing the rivet 69 through the lining and brake band and against the end of the riveting bar 6 until the rivet has been properly clinched. As the cam starts on its downward swing, the plunger 22 and parts carried thereby move downwardly, when by releasing the lifting pressure of the brake band from the riveting bar 6, the pressure of the spring 12 will restore the operating bar 69 to its initial position and release the clutch from the cam 33.

When an imperfect clinch has been made or an old lining is being removed preparatory to applying a new one, the brake band is positioned between the anvil 28 and the bar 7 when, by applying upward pressure on the brake band the slotted end of the operating bar 64 will be elevated and the lever 58 swung laterally in a direction to engage the teeth 48 of the clutch with the teeth 50 of the cam 34 and cause said cam to rotate with the shaft 35. This movement of the cam 34 will force the plunger 23 and the anvil 28 against the brake band and cause the bar 7 to force the rivet through the brake band and lining when the rivet will descend into the hollow of the anvil through the chute 73 into the receptacle 74, and this operation may be repeated until all the rivets have been removed. The operating bar is then returned to initial position as previously described and the clutch released from the cam 34.

While the description and drawings illustrate in a general way certain instrumentalities which may be employed in carrying the invention into effect, it is evident that many modifications may be made in the various details without departing from the scope of the appended claims, it being understood that the invention is not restricted to the particular examples herein described.

What is claimed is:

1. A riveting and punching machine having in combination, a rivet setting member, a rivet punching member, means for moving a rivet toward said rivet setting member, means for moving work toward said rivet punching member, an operating mechanism for operating either of said last two mentioned means and means for selectively connecting either of said last two mentioned means respectively to said operating mechanism when pressure is exerted respectively on said first or second mentioned member.

2. A riveting and punching machine having in combination, a plunger constituting a setting anvil, a plunger constituting a punch element, an arm extending transversely of said plungers and pivotally connected thereto, a clutch, a clutch operating lever for moving said clutch and extending substantially perpendicular to said arm, and means connecting said arm and lever comprising a pin in one of said elements and an upwardly inclined slot in the other of said elements in which said pin is slidable, whereby upward pressure on either of said plungers will move said clutch.

3. A riveting and punching machine having in combination, a rivet setting member, a punching member, means cooperating with said rivet setting member, means cooperating with said punching member, an operating means for each of said first mentioned means, and an actuating means adapted to either be automatically connected to one of said operating means to actuate either one respectively of said first mentioned means when upward pressure is applied respectively to said rivet setting member or said punching member.

4. A rivet setting and punching machine having in combination a rivet setting means, including cooperating members, a rivet punching means including cooperating members, operating means for actuating either one of said two means respectively, and mechanism for actuating said last mentioned means when pressure is placed respectively on one of said members.

5. A riveting machine having in combination, a rivet setting member, means cooperating with said member for setting a rivet and an operating means for said last mentioned means actuated when pressure is exerted upwardly against said rivet setting member.

6. In an automatic riveting machine, a yoke member having a pair of horizontal arms, a pair of plungers vertically movable through each arm, one pair vertically above the other means carried by one aligning set of plungers for applying rivets, means carried by the other set of plungers for removing rivets, and means controlled by the movement of the upper plungers for determining the operation of the lower plungers.

7. In an automatic riveting machine, a yoke member having a pair of arms, a pair of plungers through each arm and in vertical alinement with each other, a riveting bar carried by one of the upper plungers, a punch bar carried by the other upper plunger, a rivet carrying member carried by the plunger in registration with the plunger carrying the riveting bar, an anvil carried by the plunger in registration with the plunger carrying the punch bar, means for elevating the lower plungers and parts carried thereby when upward pressure is directed against one or the other of said bars.

8. An automatic riveting machine having in combination, a riveting bar, a punch bar, means for forcing an object against said riveting bar, means for forcing an object against said punch bar, and means controlled by the upward movement of said bars respectively for selecting the one of said first two means to be operated.

9. In an automatic riveting machine, the combination with a riveting bar and a punch bar, of a pair of plungers in alinement with said bars, means on one of said plungers for forcing a rivet against said riveting bar for clinching the same, means on the other plunger for forcing a rivet against the punch bar for removing the rivet, means for operating said plungers, and means controlled by the movement of said bars respectively for determining which of said plungers is operated.

10. In an automatic riveting machine, a riveting bar, means for retaining and guiding a rivet, means for moving said rivet retaining and guiding means towards said riveting bar, and means controlled by the movement of said riveting bar for actuating said means for moving said rivet retaining means.

11. In an automatic riveting machine, a punch bar for removing rivets, a hollow anvil for receiving the removed rivets, a receptacle for collecting said rivets, means for conveying said rivets from the anvil to said receptacle, means for moving said anvil towards said punch bar, actuated by movement of said punch bar.

12. In an automatic riveting machine, the combination with means for applying rivets to a brake band and means for removing the same from a brake band and the lining therefor, and a motor for operating the same, of a separate means for reaming and countersinking openings in the brake band lining, and means for utilizing power from said motor for operating said reaming and countersinking mechanism.

13. In an automatic riveting machine, a movably mounted riveting bar and a movably mounted punch bar, a pair of plungers adapted respectively to move an object towards said bars, a rotating shaft, cams loosely mounted on said shaft adapted to engage said plungers and move them towards said bars, a clutch between said cams and slidable on said shaft, means on the ends of said clutch adapted to engage and cause said cams to rotate with the clutch, and means interposed between said bars and said clutch adapted to move said clutch into engagement with one or the other of said cams when pressure is directed against one or the other of said bars.

14. A device of the class described having in combination, a frame, a rivet clinching mechanism carried by said frame, a motor mounted on said frame, an operating means for said mechanism, means constructed and arranged for manipulation by the operator for causing said motor to actuate said operating means, means for countersinking holes in a brake lining carried at one side of said frame, and means for operating said last mentioned means from said motor.

15. In an automatic riveting machine, the combination with a rivet clinching mechanism, and a rivet removing mechanism, of means for operating either said rivet clinching or rivet removing mechanisms, and means controlled by the movement of parts of said rivet clinching and rivet removing mechanism respectively for throwing said first mentioned means into operation and causing the same to operate said rivet clinching or rivet removing mechanism respectively.

16. A machine of the class described, having in combination, a frame, a rivet removing mechanism mounted on said frame, a motor on said frame, operating means for said mechanism, means constructed and arranged for manipulation by the operator for causing said motor to actuate said operating means, means for reaming and countersinking holes in a brake band lining carried on said frame, and means for operating said last mentioned means from said motor.

In testimony whereof, I have hereunto set my hand on this the 30th day of August, A. D. 1929.

ANDREW O. WISTI.